March 19, 1968 W. S. ROHLAND 3,374,470

ADAPTIVE THRESHOLD CIRCUITS

Filed Oct. 19, 1965 11 Sheets-Sheet 1

INVENTOR
WILLIAM S. ROHLAND

BY Francis V. Giolma
ATTORNEY

March 19, 1968 W. S. ROHLAND 3,374,470

ADAPTIVE THRESHOLD CIRCUITS

Filed Oct. 19, 1965 11 Sheets-Sheet 3

ADAPTIVE THRESHOLD CIRCUITS

March 19, 1968 W. S. ROHLAND 3,374,470

ADAPTIVE THRESHOLD CIRCUITS

Filed Oct. 19, 1965 11 Sheets-Sheet 9

| STEPPING SEQUENCES | |
|---|---|
| FORWARD | REVERSE |
| 1 - 4 | 1 - 5 |
| 1 - 5 | 1 - 4 |
| 3 - 5 | 3 - 4 |
| 3 - 4 | 3 - 5 |

United States Patent Office 3,374,470
Patented Mar. 19, 1968

3,374,470

ADAPTIVE THRESHOLD CIRCUITS

William S. Rohland, Rochester, Minn., assignor to International Business Machines Corporation, Armonk, N.Y., a corporation of New York Filed Oct. 19, 1965, Ser. No. 497,660
15 Claims. (Cl. 340—172.5)

This invention relates generally to adaptive threshold circuits, and it has relation in particular to automatic adjustment of threshold circuits in mark sensing apparatus.

Generally stated, it is an object of the present invention to provide improved threshold controls in mark sensing apparatus.

More particularly, it is an object of this invention to provide adaptive threshold circuitry in which threshold levels are first set during a learning process with a batch of control documents, and may then be further adapted to operating conditions during operation with a regular batch of documents.

One object of the present invention is to provide for utilizing, in addition to preconditioned minimum and maximum store circuits, an intermediate control threshold which defines a dividing line between valid and invalid marks.

Another object of the invention is to provide in mark sensing apparatus for interchanging the connections of the upper and lower threshold levels when the signal levels of valid and invalid marks overlap.

Yet another object of the invention is to provide in mark sensing apparatus for an adapt operating mode wherein upper and lower threshold levels are adjusted by read signals which fall between the control threshold level, and the upper and lower threshold levels respectively.

It is also an object of this invention to provide for using a prepared control document bearing marks and erasures representative of those to be encountered under normal operating conditions, for establishing upper and lower threshold levels to be used in normal document scanning.

Still another object of this invention is to provide for selectively maintaining fixed threshold levels in normal operation, or for automatically adjusting the threshold levels to accommodate marks falling between the initial levels and intermediate control level.

It is an important object of this invention to provide in an adaptive threshold circuit for using minimum mark level and maximum erasure level storage circuits for controlling upper and lower threshold circuits for each of a plurality of read head channels, and for using a common mix circuit responsive to a signal from any channel for adapting the storage circuit levels during operation.

Yet another object of the invention is to provide in a manimum mark level storage circuit for initially charging a capacitor to a maximum value and then discharging it to a lower value each time a read signal is detected having a lower value, which is above a control value.

It is also an important object of this invention to provide for storing a signal representative of the voltage amplitude of a read signal in mark sensing apparatus, and for using the stored signal to control the levels of long-time minimum mark and maximum erasure threshold level signal storage means.

Yet another important object of this invention is to provide for using motor operated potentiometer devices for establishing upper and lower threshold long-time signal levels for upper and lower threshold detector circuits associated with a mark sensing read head, temporarily storing a signal in accordance with the amplitude of a read signal, and using the temporarily stored signal for effecting operation of the motor operated potentiometer means to modify the long-time threshold signal levels.

In practicing the invention, in accordance with one of its embodiments, a multiple channel read head employs dual threshold circuits for each channel, and all signals below the lower threshold are judged to be unwanted signals, while all signals above the upper threshold are classed as intended marks.

In a learn mode control documents having a number of marks and erasures representative of the range to be encountered in normal operation are read, and threshold levels are established, as well as a control level which lies at some predetermined point therebetween.

The system is then placed in the hold or adapt mode for reading a batch of documents. In the hold mode, signals above the upper threshold are classed as intended marks and signals below the lower threshold as unwanted or noise signals. Signals falling between the upper and lower thresholds in the hold mode may be handled in one of several ways by the data handling circuitry, depending on how the machine is programmed to accommodate single and multiple marks within a logical group of marking positions. In the adapt mode as each signal is detected, the threshold levels are compared therewith and are changed whenever the signal falls between the upper threshold and the control level, or between the lower threshold and the control level, so as to continuously modify or adjust the threshold values in accordance with the range of marks being sensed.

The foregoing and other objects, features and advantages of the invention will be apparent from the following more particular description of preferred embodiments of the invention, as illustrated in the accompanying drawings.

Figures 7A, 7B:
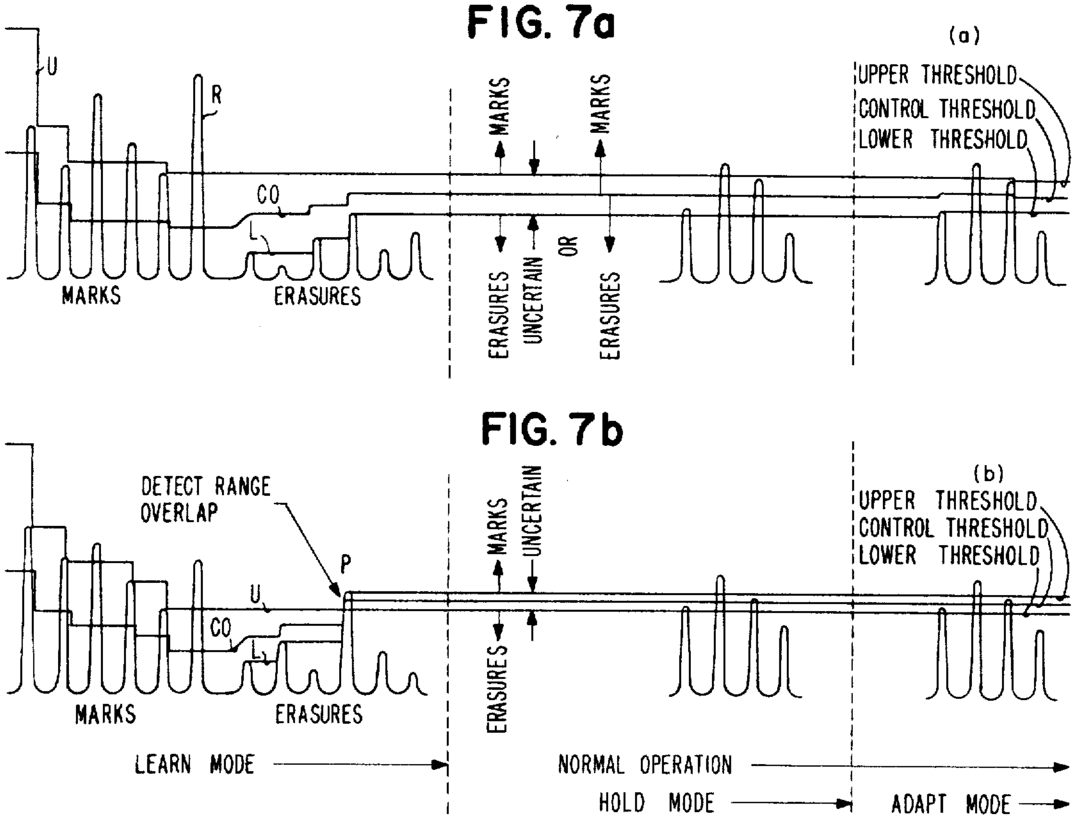
Figure 8:
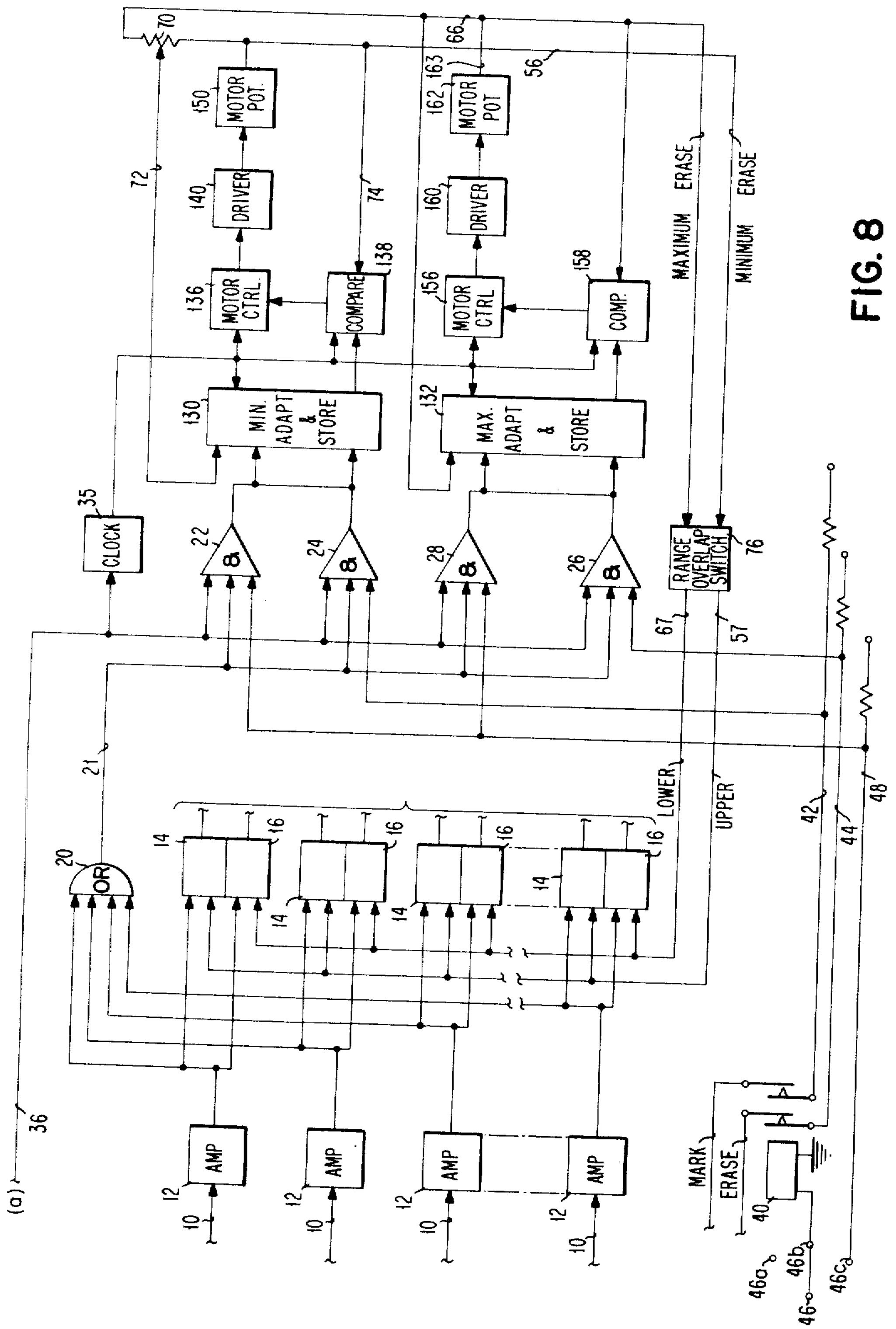
Figure 9:
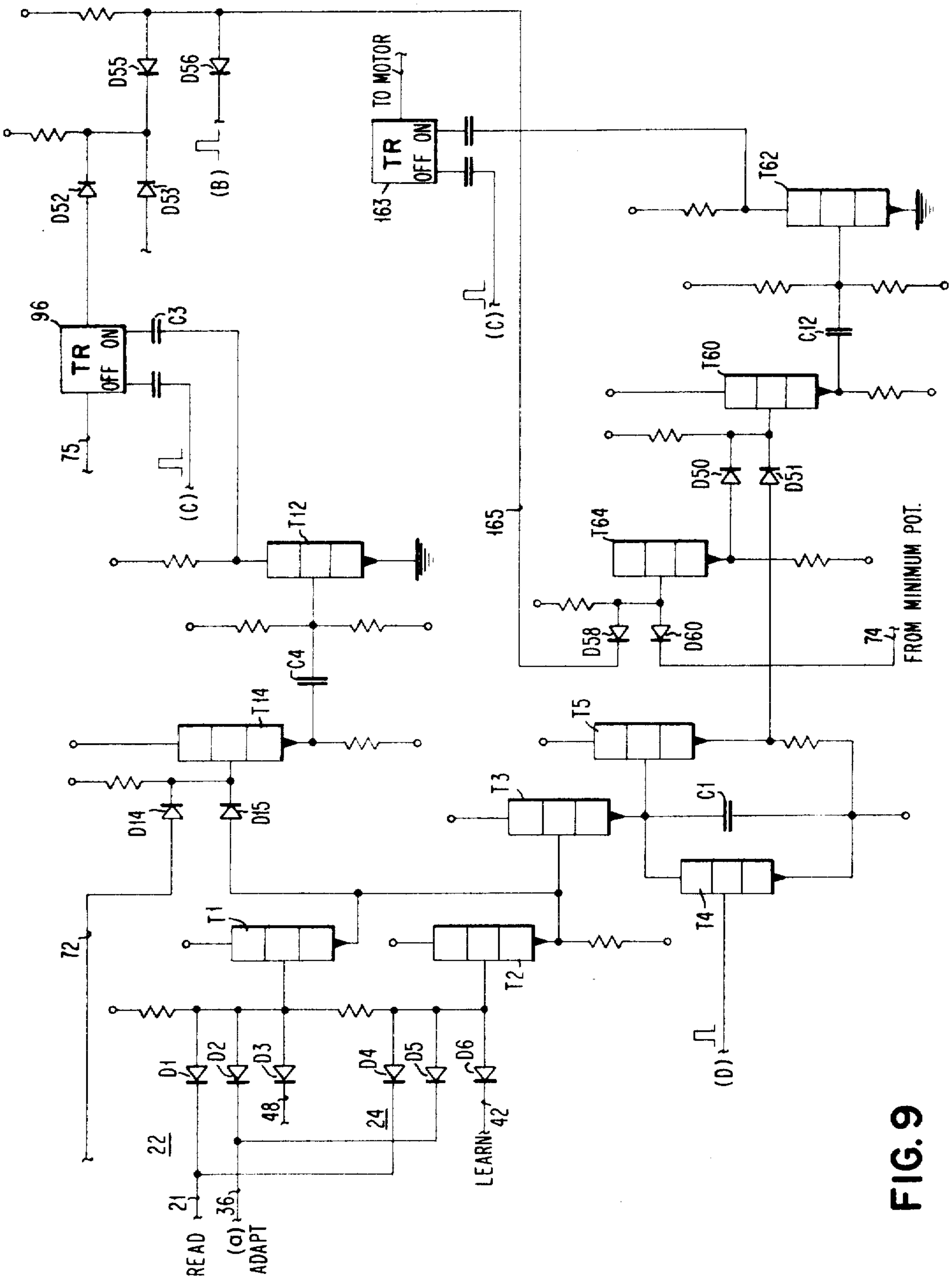
Figure 10:
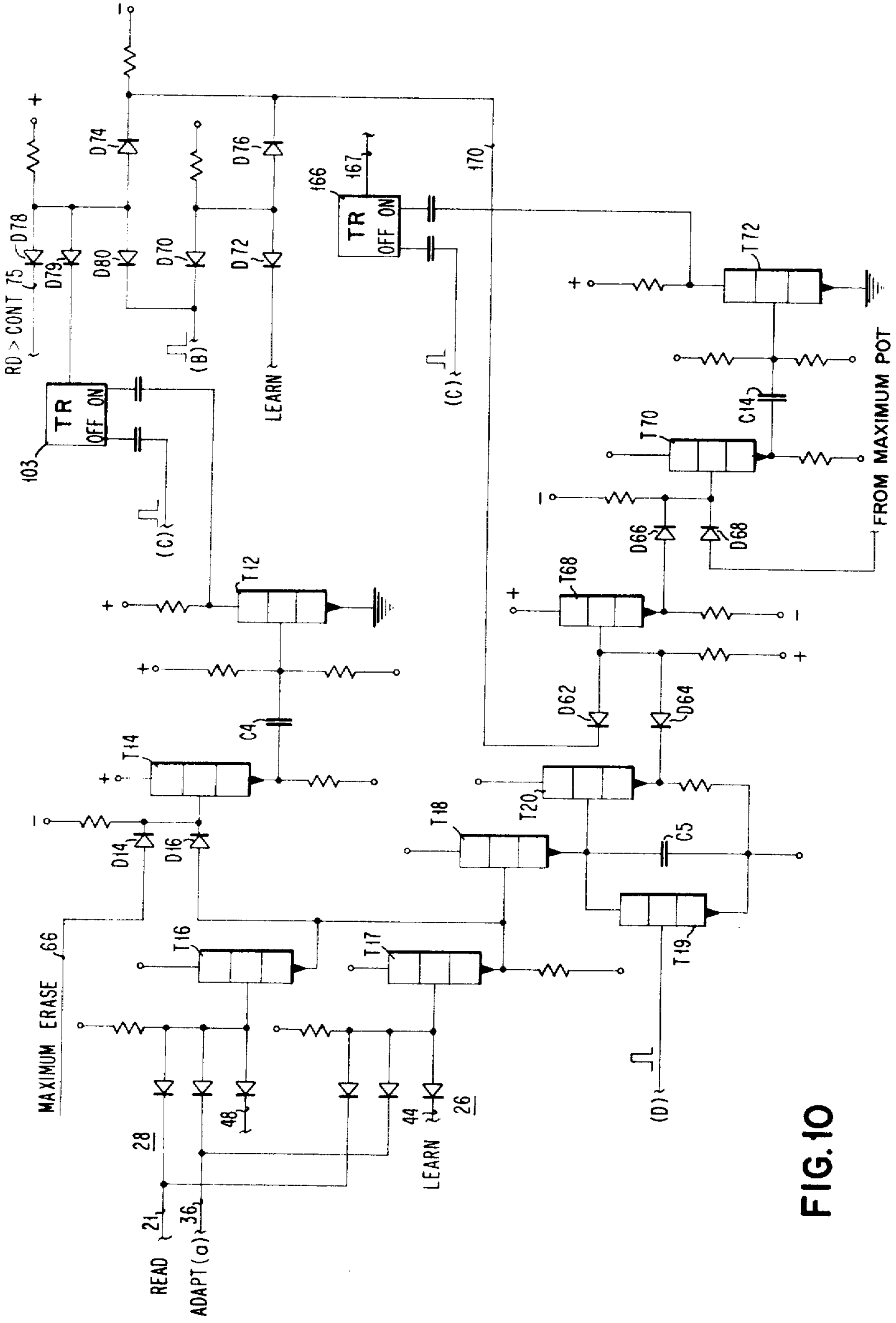
Figures 11, 11A:
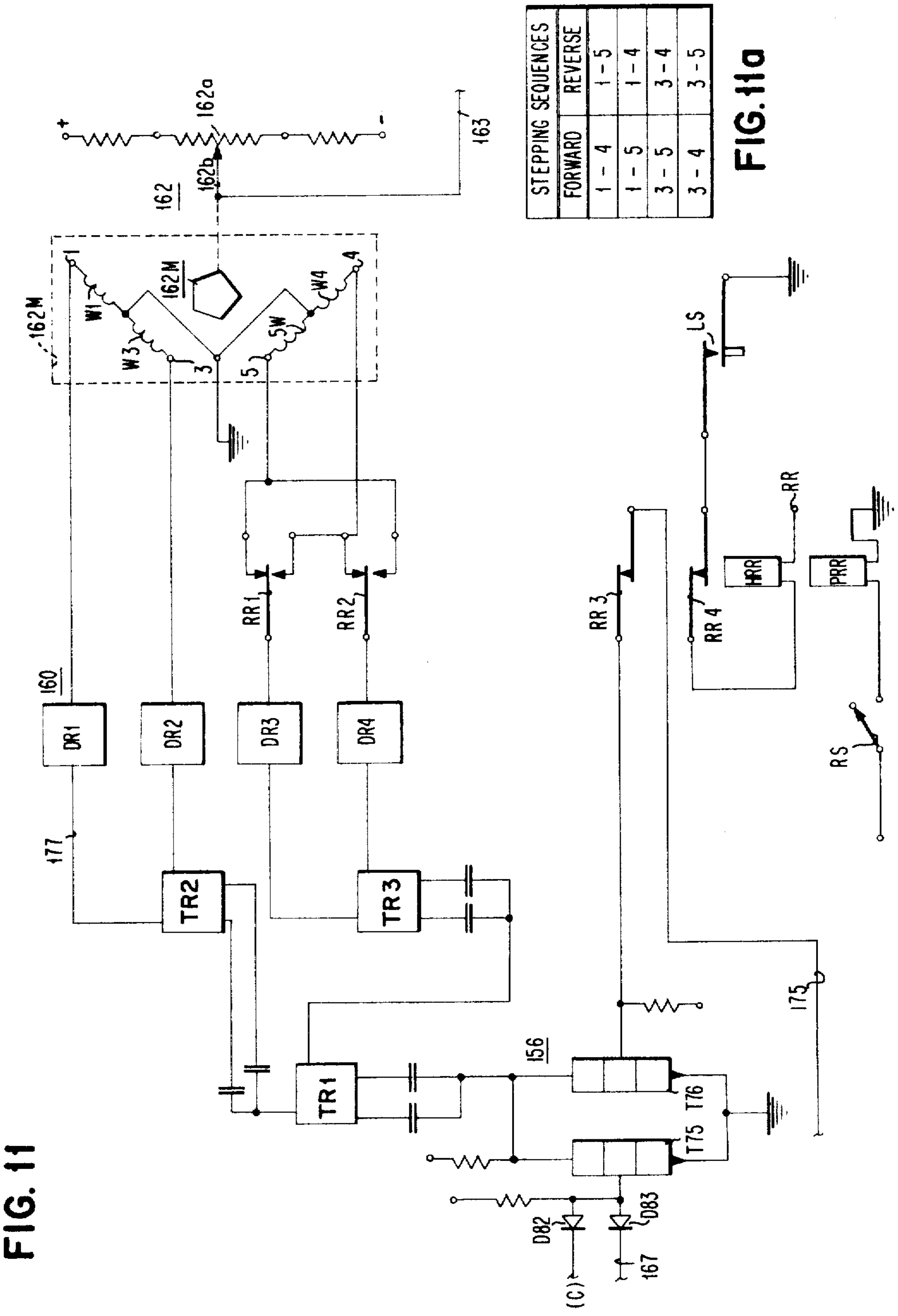
Figure 12:
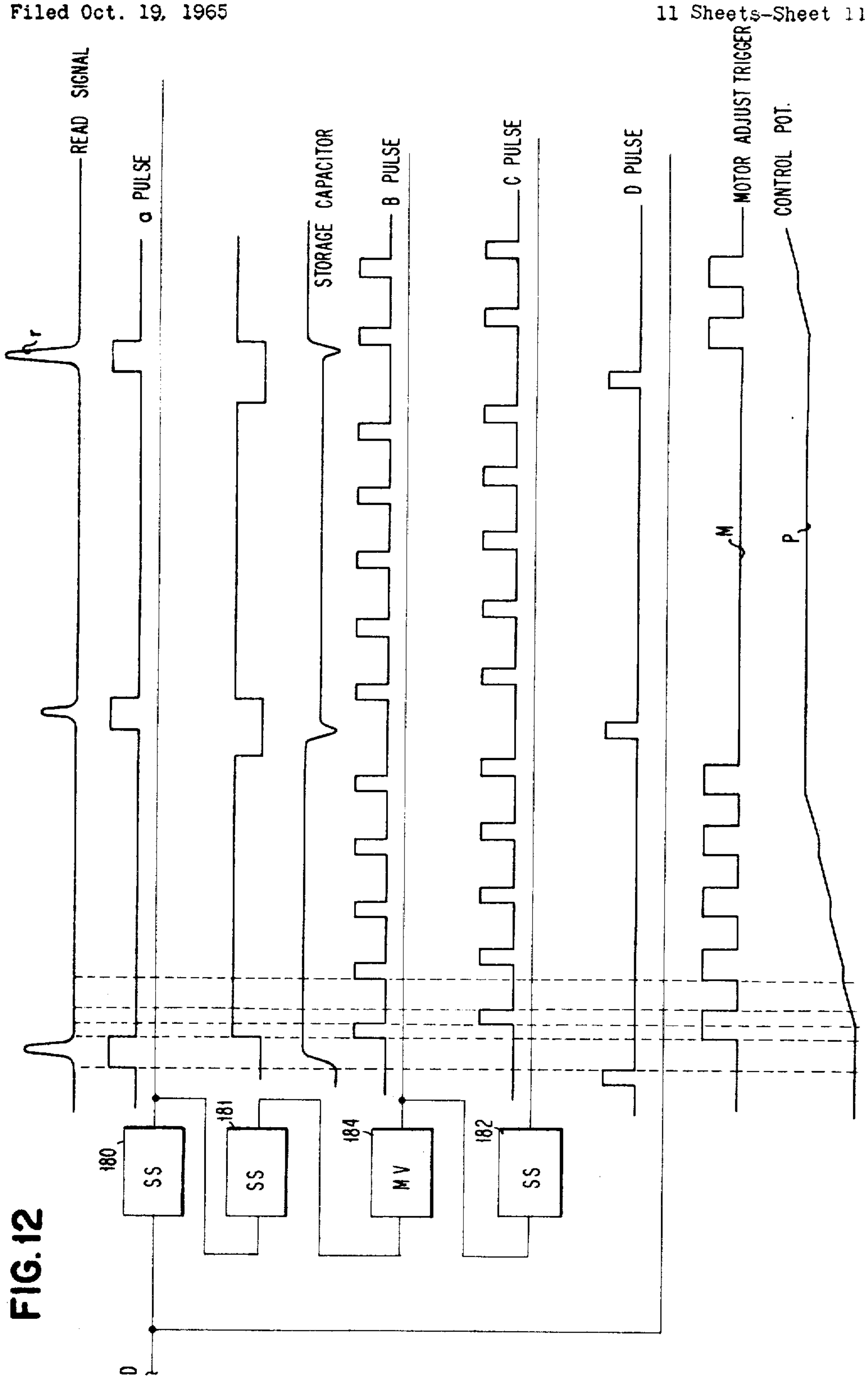

FIG. 7*a* shows characteristic curves illustrating the relationship of mark read signals and erasure read signals relative to the upper and the lower threshold levels for the learn mode, hold mode and adapt mode;

FIG. 7*b* shows characteristic curves representing the relations between mark and erasure read signals relative to the upper and the lower threshold levels for conditions where a range overlap exists;

FIG. 8 is a schematic diagram in block form in part, of a mark sensing system utilizing the adaptive threshold circuit of the present invention in a different form;

FIG. 9 is a schematic diagram showing the circuit details of the minimum mark threshold learn and adapt gates, store, adapt mode control, compare, and the motor adjust trigger circuit;

FIG. 10 is a schematic diagram showing circuit details for the maximum erasure threshold gates, store, adapt mode control compare and motor adjust trigger circuit;

FIG. 11 shows detail circuitry of the motor drive control triggers, the motor drivers, the potentiometer and potentiometer operating motor together with the controls therefor;

FIG. 11*a* shows a table illustrating the sequences, in which motor winding combinations must be energized for both forward and reversed stepping; and FIG. 12 is a block diagram of the clock for generation of the necessary timing signals together with curves showing the relationship of the signals to the read signal.

Figure 1:
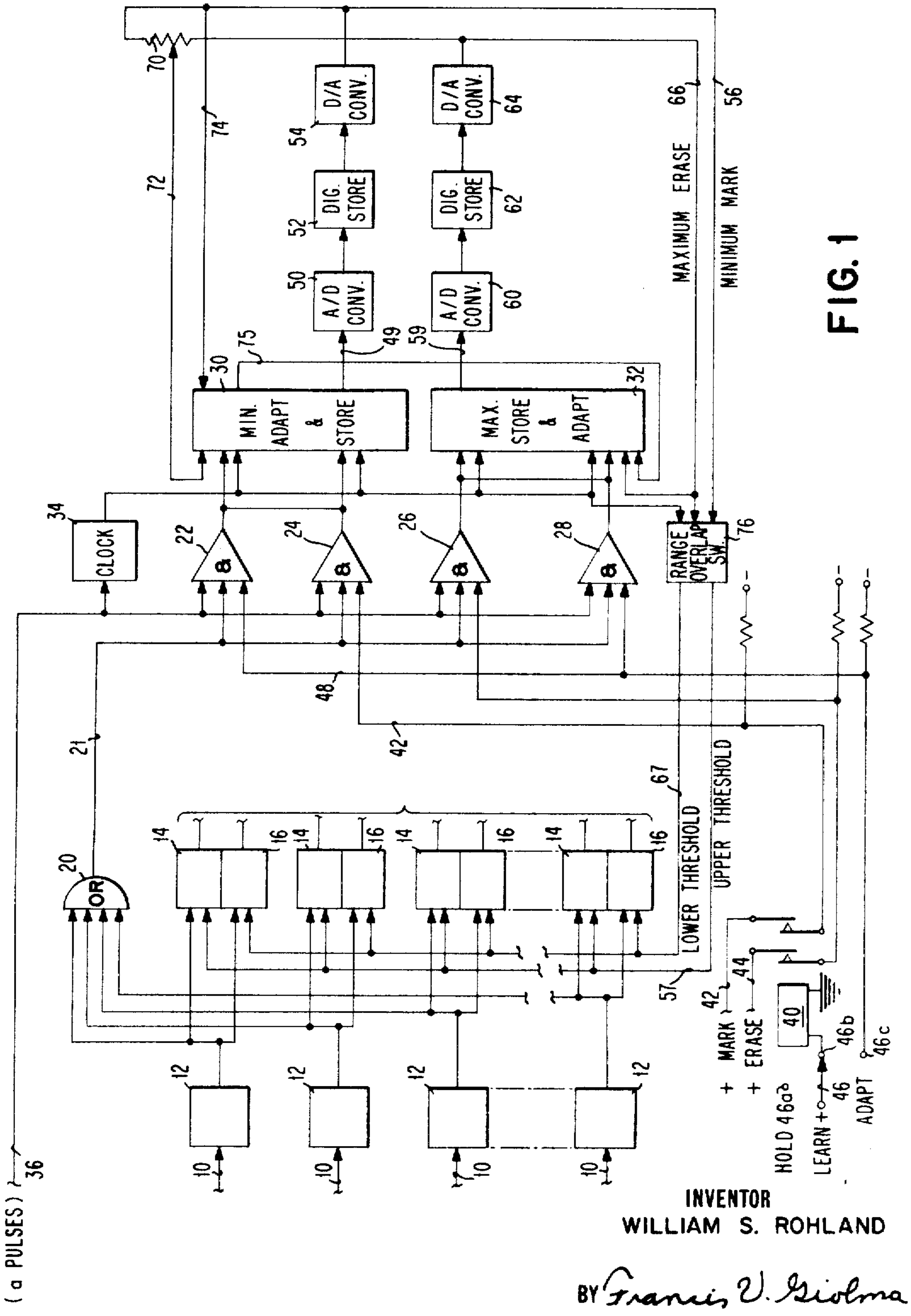
FIG. 1 is a block diagram, in part, of a mark sensing system utilizing the adaptive threshold circuitry of the invention.

Referring generally to FIG. 1, the arrows 10 may indicate the outputs from each of the channels of a multichannel read head disposed to read marks in all possible marking positions of a test score document, for example, these outputs being connected to associated amplifiers 12, the output of which is applied to pairs of threshold detector circuits 14 and 16 for providing upper and lower thresholds to determine whether or not a mark is a valid mark or an erasure. The outputs of the amplifiers 12 are also each connected to a mix or OR circuit 20 for providing a read signal on the output line 21 for any mark detected on any of the channels. The read signal from line 21 is applied to each of a plurality of AND gates 22, 24, 26 and 28, which are connected to apply output signals to minimum adapt and store circuits 30 and maximum adapt and store circuits 32 respectively. A clock generator 34, which is controlled by pulses over line 36 designated *a* pulses, which are produced in accordance with commutator marks along the document in predetermined relation to the mark positions, is connected for applying timing signals to the circuits 30 and 32 in conjunction with the outputs of the gates. The timing pulses from line 36 are also applied to the gates 22–28. In order to selectively control the gates 24 and 26, a control relay 40 is provided having contacts 40*a* and 40*b* for selectively connecting mark and erase field lines 42 and 44 to the gates 24 and 26 respectively, when the apparatus is in the learn mode, as indicated by the intermediate position 46*b* of the switch 46, as shown. A hold position 46*a* is provided in which the relay is disconnected, as well as an adapt position 46*c*, wherein a line 48 is connected to apply a positive potential to the gates 28 and 22 for purposes which will be described hereinafter.

The minimum adapt and store circuit 30 is connected by line 49 to an analog-to-digital converter 50, which in turn is connected to a digital store circuit 52, and thence to a digital-to-analog converter circuit 54, the output of which is connected by means of line 56 to provide a minimum mark level to a range overlap switch 76. The maximum store and adapt circuit 32 is similarly connected by line 59 through an analog-to-digital converter 60, a digital store circuit 62 and a digital-to-analog converter 64, and thence to a line 66, comprising a maximum erasure level which is also applied to the range overlap switch. The lines 56 and 66 are connected by a potentiometer 70 which provides a control threshold level intermediate the levels of lines 56 and 66 over line 72 to the minimum adapt and store circuit 30. Line 74 connects the minimum mark line 56 to the minimum adapt and store circuit 30. The lines 56 and 66 are connected to the threshold circuits 14 and 16 through lines 57 and 67, and a range overlap switch 76 for selectively determining the connections of the lines 56 and 66 to the lines 57 and 67, depending upon whether erasures and marks have an overlap range.

Figure 2:
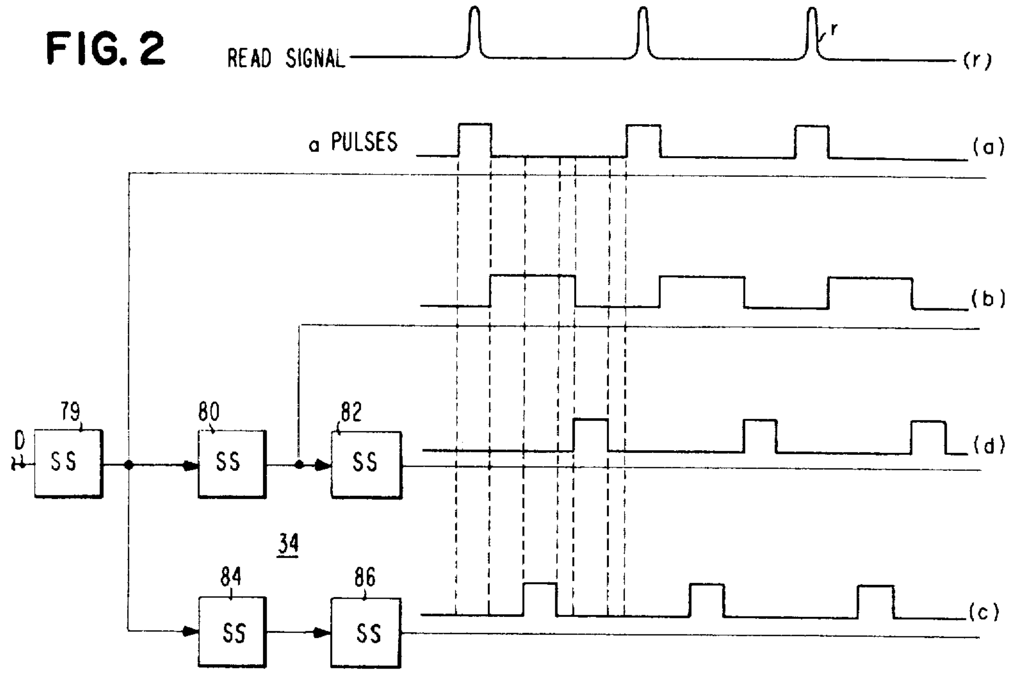
FIG. 2 is a block diagram of a clock generator together with curves showing the relationship of the read signal to the timing signals developed by the clock.

Referring to FIG. 2, the reference numeral 34 designates generally the clock of FIG. 1. As shown, it may comprise a single shot 79 connected to two pairs of single shots 80–82, and 84–86 connected in parallel. The single shot 79 responds to D pulses which are produced by commutator marks on the document and produces timing pulses represented by the curve *a* and which occur in predetermined timed relation to the read signals represented by the curve *r*. As shown, the single shot 80 produces a *b* pulse in response to each *a* timing pulse, having a duration about 2½ times the duration of the *a* pulse. The single shot 82 which is triggered by the fall of the *b* pulse, produces a *d* pulse which is delayed, but has a duration on the order of the *a* pulse. Likewise, single shot 86 produces a *c* pulse having a duration on the order of the *a* pulse, but immediately before the termination of the *b* pulse, being triggered by the single shot 84, the single shot 84 having a duration of about that of the *a* pulse.

Figure 3:
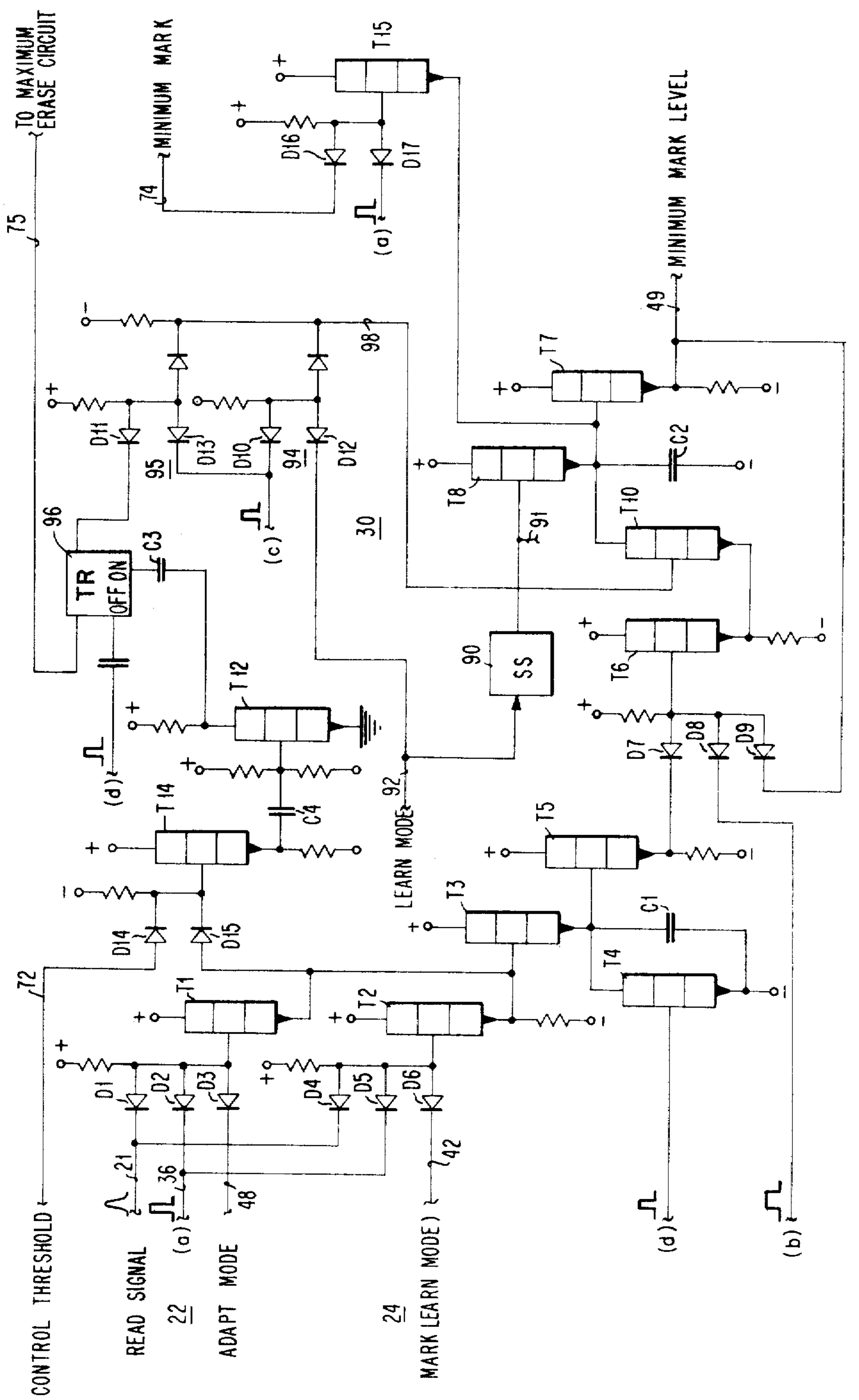
FIG. 3 is a schematic diagram showing details of the minimum mark store and minimum mark adapt circuits of FIG. 1.

Referring to FIG. 3, it will be seen that the gates 22 and 24 consist of diode AND circuits comprising diodes D1–D3 and D4–D6, respectively, connected to the bases of transistors T1 and T2 which are arranged in common emitter follower configuration as an OR circuit. By selecting the signal levels so that the lead signal input over line 21 is always less positive than either the *a* pulse or the adapt or learn mode levels applied over the lines 48 and 42, respectively, the emitter output level will follow the amplitude of the read signal.

This is applied to the transistor T3 during the learn and adapt modes from the common T1–T2 emitters for charging a capacitor C1 so as to place thereon a charge and raise the voltage level of C1 to a value proportional to the read signal. The capacitor C1 is shunted by a transistor T4 which is used to discharge the capacitor C1 at *d* pulse time. The capacitor C1 is connected to the base of an emitter follower transistor T5 for applying the read signal amplitude level to an emitter follower transistor T6 through a diode AND circuit comprising diodes D7–D9 for comparing at *b* pulse time the potential of the capacitor C1 with that of a storage capacitor C2 which determines the minimum mark level over line 49. The capacitor C2 is connected to the base of an emitter follower transistor T7 for controlling the level of the line 49.

The capacitor C2 is disposed to be initially charged to a maximum value above any read signal value to be encountered, by means of a transistor T8, which is triggered by a single shot 90 in response to the initial switching to the learn mode over line 92 at the beginning of an operation. The capacitor C2 is connected to be discharged from this maximum level in accordance with a read signal through transistor T10, which is connected across the capacitor C2 and has its emitter connected to the emitter of transistor T6 so that the emitter of transistor T10 is biased to the level of the read signal as evidenced by the charge on the capacitor C1. The transistor T10 during the learn mode is turned on each time there is a *c* pulse through the gating action of AND 94 comprising diodes D10 and D12.

The transistor T10 during the adapt mode is turned on each time there is a *c* pulse, through the operation of AND circuit 95, comprising diodes D11 and D13; provided that the trigger 96 is turned on. The ON output of the trigger 96 is applied to the diode D11, while the *c* pulse is applied to the diode D13. Coincidence of these signals results in raising the level of line 98 to turn on the transistor T10. The trigger 96 is controlled by a transistor T12 which is turned on to produce a negative pulse through capacitor C3 in response to a positive output pulse from capacitor C4 which is produced by changing the operating level of the transistor T14. This transistor is controlled by an OR circuit of diodes D14 and D15. The control threshold level from line 72 is applied to the diode D14, while the common emitter follower signal of transistors T1–T2, which is equal to the amplitude of the read signal is applied to the diode D15. Since the higher of the two signals applied to the OR circuit appears at the output of the transistor T14, the operating level of T14 can be changed to turn on the trigger 96 when the read signal exceeds the control threshold level over line 72.

In order to stabilize the charge of the mark level store capacitor C2 against negative drift, a transistor T15 is provided for connecting the capacitor C2 to a source of positive potential. The transistor T15 is turned on through an AND circuit comprising diodes D16 and D17, the *a* pulse timing signal being applied to the diode D17, and the level minimum mark from conductor 74 being applied to the diode D16.

Thus, capacitor C2 is utilized to store a voltage level equal to the signal amplitude of the lowest amplitude mark signal encountered while in the learn mode. Further, while in the adapt mode, the charge on capacitor C2 may be reduced when a read signal amplitude falling above the control threshold level and below the voltage level currently on capacitor C2 is encountered.

Figure 4:
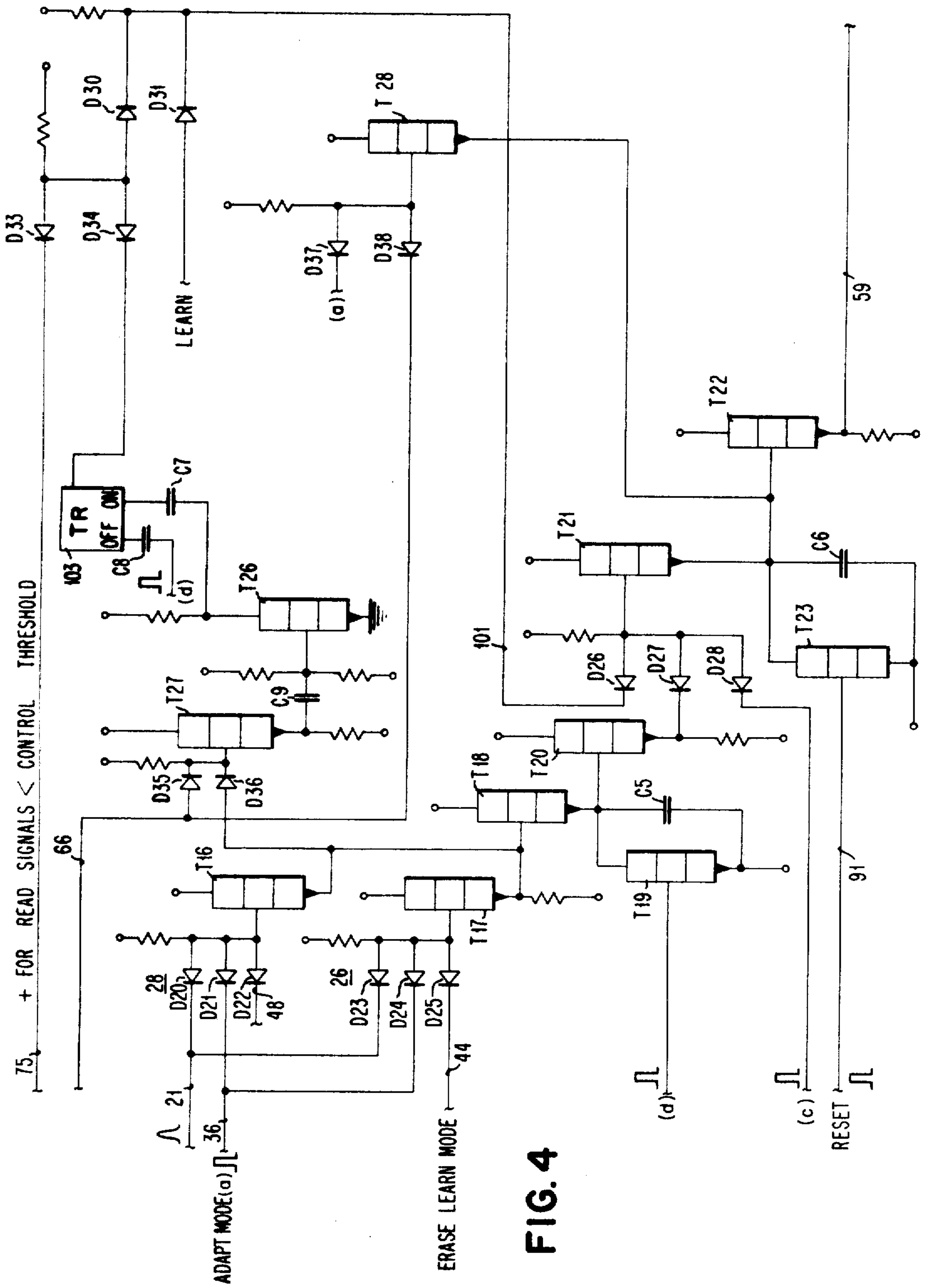
FIG. 4 is a schematic circuit diagram showing details of the maximum erasure store and maximum erasure adapt circuits of FIG. 1.

Referring to FIG. 4, it will be likewise seen that the gates 26 and 28 of FIG. 1 comprise diodes D23–D25 and D20–D22, respectively, and are connected to the base electrodes of the transistors T17 and T16 connected in a common emitter follower configuration as an OR circuit. This common emitter point is connected to control a capacitor control transistor T18 for placing a charge on a capacitor C5 which is proportional to the read signal applied to the AND circuits over conductor 21. A shunt connected transistor T19 is provided for discharging the capacitor C5 to reset it at *d* pulse time. A transistor T20 connected in emitter follower configuration provides an output in the form of a voltage level which is proportional to the read signal. This output is applied through diode D27 of a three-way AND gate, comprising diodes D26–D28 for controlling a store capacitor control transistor T21 for applying a charge at *c* pulse time to a maximum erasure level capacitor C6 which is connected through an emitter follower transistor T22 to the maximum erasure level line 59 of FIG. 1.

In order to provide for changing the level on the capacitor C6, which is initally discharged by means of a shunt connected transistor T23, in response to a reset pulse which may be provided by the learn mode single shot 90 of FIG. 3, one input to the AND circuit comprising the diodes D26–D28, is provided by connecting diode D27 to the emitter of transistor T20. The diode D28 is connected to the *c* pulse output of the clock, and diode D26 is gated by a positive voltage applied over the line 101. During the learn mode, this level is provided by a learn gate applied to the diode D31 of an OR circuit comprising diodes D30 and D31. When in the adapt mode, this level is derived from the AND circuit comprising diodes D33 and D34. The diode D34 is connected to the on side of the trigger 103, which is set by transistor T26, which when turned on, produces a negative turn-on pulse at capacitor C7. The trigger is reset by a *d* pulse applied to the off side through the capacitor C8. The transistor T26 is turned on by a pulse from a capacitor C9, produced by control transistor T27 through an OR circuit comprising diodes D35–D36, which are connected respectively to the maximum erasure level line 66 and to the common emitters of transistors T16 and T17, whose output corresponds to the amplitude of the read signal over line 21. Accordingly, whenever the read signal is greater than the maximum erasure signal, the transistor T27 may be controlled in accordance with the level of the read signal, and a pulse will be produced to turn on the trigger 103.

Stabilization of the charge of the maximum erasure level capacitor C6 against negative drift is effected by means of transistor T28 which is controlled through an AND circuit comprising diodes D37 and D38, to which are applied the *a* pulse and the maximum erasure level from line 66, for restoring the voltage level of C6 to the maximum erasure threshold level.

Thus, capacitor C6 is utilized to store a voltage level equal to the signal amplitude of the highest amplitude erasure signal while encountered while in the learn mode. Further, while in the adapt mode, the charge on capacitor C6 may be increased when a read signal amplitude falling above the maximum erase level on conductor 66 and below the control threshold level is encountered.

Figure 5:
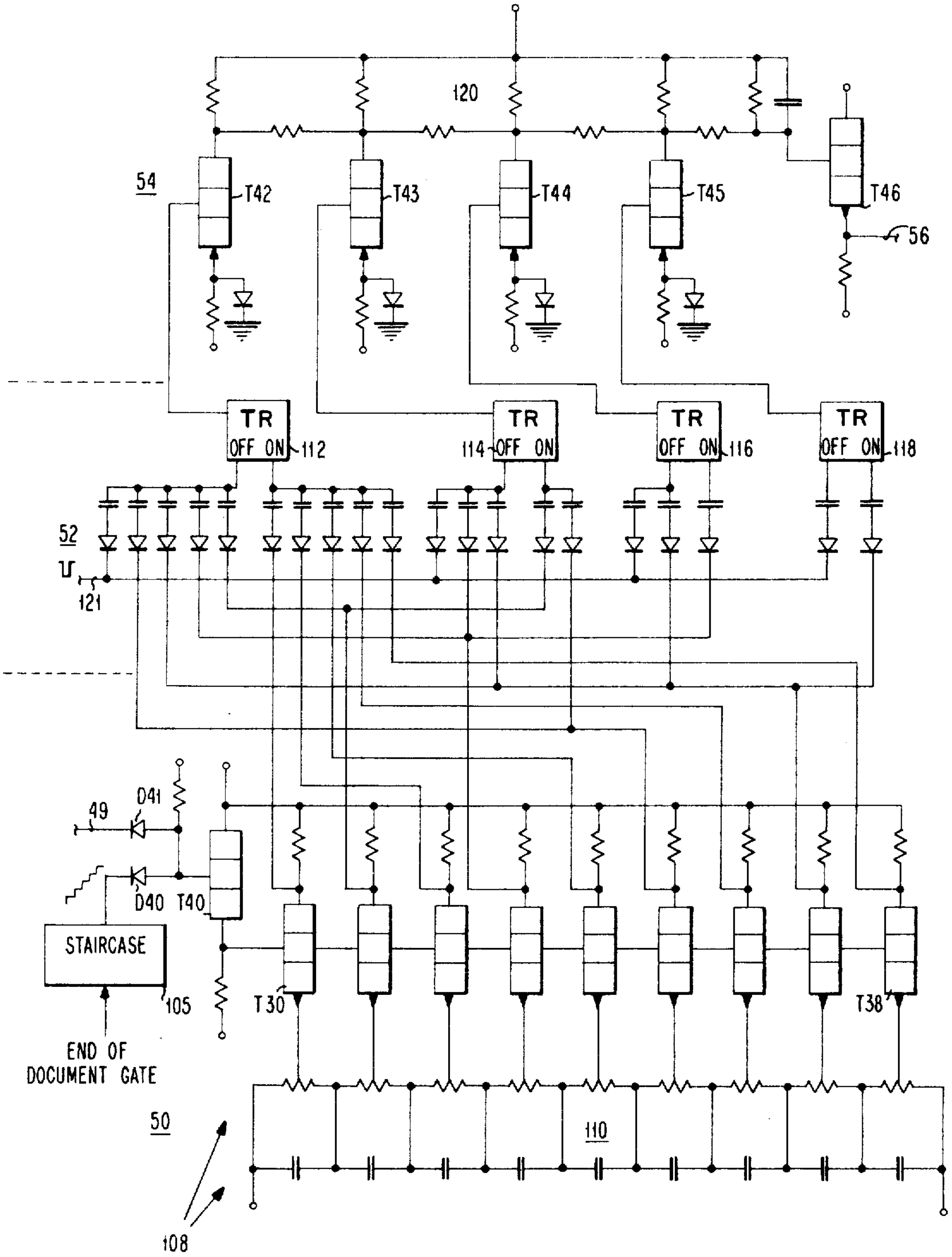
FIG. 5 is a schematic circuit diagram showing circuit details of the analog-to-digital converter, the digital store and the digital-to-analog converter of FIG. 1.

Referring to FIG. 5, there is shown a schematic diagram of the detailed circuitry of the minimum mark level analog-to-digital converter 50, the digital store 52, and the digital-to-analog converter 54 of FIG. 1. Since the circuitry for these devices is substantially identical with that of the circuits for the corresponding devices, 60, 62 and 64 in the maximum erase level store and adapt circuit, the detailed description of the circuitry for the devices 50, 52 and 54 should suffice. As shown, the output of a staircase generator 105 during the end-of-document gate is applied to an AND circuit comprising diodes D40 and D41, the analog output level signal of the store capacitor C2 of FIG. 3, being applied from conductor 49 to the diode D41 to clip the characteristic output curve of the staircase generator when the step level corresponds to the level applied from the line 49, and determine the number of step pulses allowed to pass. This output is applied to a discriminator circuit 108 comprising a plurality of common base connected transistors T30–T38, whose emitters are biased by a divider network 110, and which are driven by an emitter follower transistor T40 connected to the bases. The transistors T30–T38 control a plurality of triggers 112–114, 116–118, which provide a binary counter. These triggers store the digital value of the analog level of conductor 49 and are connected to a plurality of output transistors T42–T45. The transistors T42–T45 are connected to a well-known ladder circuit 120 for providing a long-time store threshold level applied to an emitter follower transistor T46 for providing a maximum erasure long-time level over line 56 of FIG. 1. The triggers 112, 114, 116 and 118 are reset by an end-of-document signal on line 121, and the generator 105 is gated on by an end-of-document gate which follows the end-of-document signal.

Figure 6:
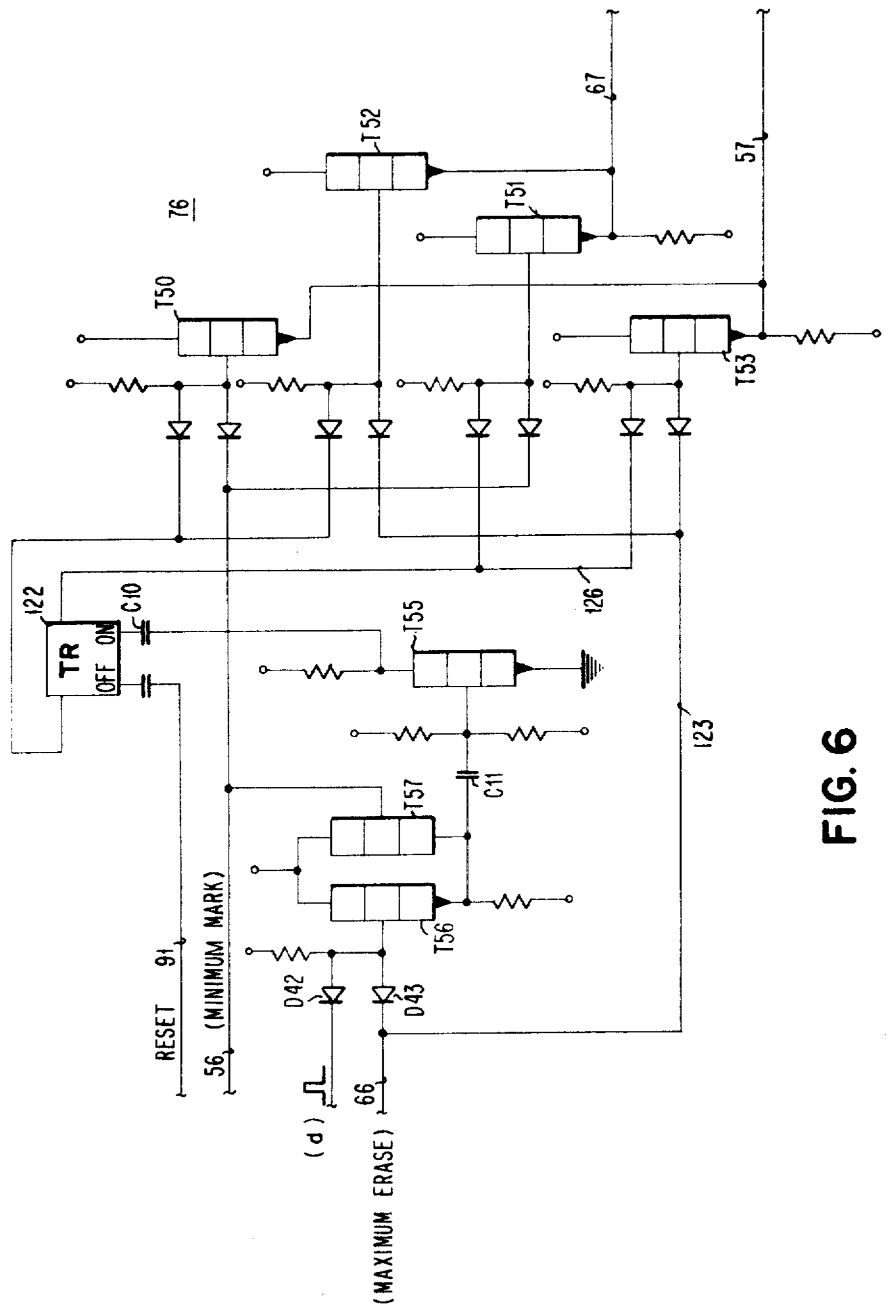
FIG. 6 is a schematic circuit diagram showing circuit details of the range overlap switch of FIG. 1.

Referring to FIG. 6, it will be seen that the range overlap switch 76 of FIG. 1 may comprise a pair of transistors T50 and T51 for selectively connecting the minimum mark level line 56 to either the upper threshold line 57 or the lower threshold line 67, as well as a pair of transistors T52 and T53 for selectively connecting the maximum erasure level line 66 to the lower threshold line 67, or the upper threshold line 57. During overlap, which means that the minimum mark level is lower than the maximum erasure level, the connections are controlled by an overlap trigger 122, which is turned on by a negative pulse from capacitor C10 through operation of a control transistor T55 which is controlled by a differential comparator comprising transistors T56 and T57 arranged in a common emitter follower configuration. The minimum mark level applied over line 56 to the base of transistor T57 will be the level appearing at the T56–T57 common emitter point at all times during non-range overlap. This is true because the output of the AND circuit comprising diodes D42 and D43 will be at the potential of the maximum erasure level applied over line 66 during the *d* pulse, and at the *d* pulse down level at all other times. During non-range overlap, the base of transistor T56 is therefore always at a lower potential than the base of transistor T57, thereby keeping transistor T56 cut off and keeping the common emitter point at the minimum mark level. The absence of a change in potential at this point will result in no change in transistor T55 and no change in state of the overlap trigger 122. Hence, the trigger 122 which is reset, for example, by the output of the single shot 90 of FIG. 3, will remain turned off, and the off output will be up, thus enabling gating transistors T50 and T52. Accordingly, the minimum mark level appearing on line 56, will appear at the emitter of transistor T50 and determine the output level of the upper threshold level line 57. Likewise, the maximum erasure level from line 66 will be applied over conductor 123 and 124 to transistor T52 and appear at the emitter thereof to determine the level of the lower threshold level line 67.

Should the minimum mark level of line 56 drop to a value below the maximum erasure level value of line 66, transistor T57 will establish the lower value from line 56 at the T56–T57 common emitter, and when transistor T56 is switched on by the *d* pulse, the higher potential value of line 66 will appear at the T56–T57 common emitter at *d* time, and will therefore provide a positive pulse to capacitor C11, causing the transistor T55 to turn on, and apply a negative going pulse to the capacitor C10 to turn the trigger 122 on. With the trigger 122 turned on, the on output level of the trigger appearing over line 126, is applied to the transistors T53 and T51. Accordingly, with transistor T51 turned on, the minimum mark level of line 56 will appear at the emitter of transistor T51, thus in effect, connecting the minimum mark level line 56 to the lower threshold level line 67. In a like manner, the maximum erasure level line 66 will be connected through the transistor T53 to the upper threshold level line 57. This effectively reverses the connections of the digital-to-analog converters 54 and 64 to the upper and lower threshold circuits 14 and 16 to correct for a range overlap condition.

The equipment with which the invention is used, employs a multiple channel reflective read head with an amplifier 12 and a dual threshold circuit 14–16 for each channel as indicated on the left-hand portion of FIG. 1. All signals falling below the lower threshold are judged to be unwanted signals, that is, erasures or background noise. All signals falling over the upper threshold are judged to be intended marks. Signals falling between the two thresholds could be either weak intended marks, or poor erasures, and are classed as uncertain. A single signal in the uncertain range in a word requiring one and only one mark, is considered to be the intended mark. The two thresholds are currently manually adjustable but are difficult to optimize for specific application or for even a given batch of documents. With the invention as described herein, in the learn mode, the switch 46 is operated to the learn position as shown, thus providing the circuit for the learn relay 40. This closes contacts 40*a* and 40*b* and provides for connecting the gates 24 and 26 to the mark field and erase field lines 42 and 44, thus placing a positive control potential on the gates 24 and 26 whenever the mark and erase field lines are energized. With the system in this condition, a control document, not shown, prepared with a number of marks and erasures representative of the range of marks and erasures to be encountered under normal conditions on a specific batch of documents is read by the system. When scanning the marks, the line 42 of FIG. 1 is connected to the positive terminal of the source, either manually or through a programmed operation, and the gate 24 will be enabled each time an *a* pulse indicating a mark position occurs. When a learn mode signal is applied to conductor 92, in FIG. 3, the single shot 90 is enabled, and a pulse is applied to the transistor T8 turning it on to charge the capacitor C2 to its maximum value. When the mark corresponding to the *a* pulse is read, the read signal is applied to the transistor T2 in conjunction with the learn mode control potential through AND circuit 24, so that transistor T2 is turned on and applies a positive signal to the base of transistor T3 turning it on to charge the capacitor C1 to the emitter level of the transistor T2, or in accordance with the value of the particular read signal detected. At *b* time transistor T6 is enabled and when the *c* pulse occurs, which is gated with the learn signal through AND circuit 94, transistor T10 is switched on to apply the emitter level of the transistor T6 to the capacitor C2 causing the capacitor C2 to discharge to the level of the signal on the capacitor C1. At *d* time, transistor T4 is turned on, applying a short across the capacitor C1 causing it to discharge and prepare it for reading the next mark signal. The voltage on the capacitor C2 will thus be established at a level which is in accordance or nearly equal to the minimum mark signal amplitude. This output over line 49 is applied during the end-of-document gate to the analog-to-digital converter 50 of FIG. 5, causing one or more of the transistors T30–T38 to turn on and one or more of the triggers 112–118 to be set in a binary count, and establishing along-time minimum mark level over line 56 at the emitter of the transistor T46 of the digital-to-analog converter 54.

At the conclusion of reading the representative marks, the representative erasures may be read, and with the erase line 44 of FIG. 1 raised, the gate 26 will be enabled each time an *a* pulse occurs, concurrent with the detection of an erasure producing a read signal. As shown in FIG. 4, the transistor T17 will be switched on thus producing an output at the emitter corresponding to the level of the read signal detected. This switches the transistor T18 and charges the capacitor C5 in accordance with the amplitude of the read signal. Upon the occurrence of the *c* timing pulse, the transistor T21 will be enabled through the diode gate D26–D28 since the learn signal is applied to line 101 through the OR circuit diode D31. The capacitor C6, which was initially discharged by turning on transistor T23 through the reset pulse on conductor 91 from the single shot 90, will receive a charge corresponding to the charge on the capacitor C5 through the action of the emitter follower transistor T21. This output appears at the emitter of the emitter follower transistor T22 and is applied to the line 59 for application to the analog-to-digital converter 60, the digital store device 62 and the digital-to-analog converter 64 for producing a maximum erasure threshold level on line 66.

The system may then be placed in either the hold or the adapt mode. In the hold mode, all thresholds are held at the levels established while in the learn mode, and the system performs as with fixed thresholds optimized for a given batch of documents. Signals now falling between the upper and lower thresholds may merely be identified as uncertainties or classified as mark and erasures, depending upon whether they are above or below the control threshold.

In the adapt mode, the system performs as in the hold mode, except that the thresholds are automatically adjusted to accommodate signal amplitudes outside of the ranges of marks and erasures observed while in the learn mode. A signal falling between the upper and control thresholds is assumed to be a mark, and the upper threshold is adjusted to the amplitude of this signal. Likewise, a signal falling between the control and the lower threshold is assumed to be an erasure or an inadvertent mark; and the lower threshold is adjusted to the amplitude of this signal.

In the adapt mode, the switch 46 is moved to position 46*c* and the line 48 is energized, thus enabling gates 22 and 28 of FIG. 1.

Referring particularly to FIG. 3 of the drawings, it will be seen that the gate 22 controls the transistor T1 to provide an emitter signal corresponding to the read signal for turning on the transistor T3, which places a charge on the capacitor C1. The voltage of C1 appears at the emitter of transistor T5 and is transmitted through the gate D7–D9 at *b* time, in the same manner as described for a learn mode, for modifying the charge on the capacitor C2 to adjust the minimum mark level threshold on conductor 49.

However, the turn-on of transistor T10, instead of being controlled by a learn mode signal over line 92, and through AND gate 94 with the *c* pulse, it now is controlled through AND circuit 95 in response to an on output from trigger 96. This trigger is reset at each *d* time and is turned on under the control of transistor T12 in response to an output pulse through capacitor C4 as a result of an incremental change in the transistor T14 emitter voltage. A positive change in voltage at the emitter of transistor T14 can result only when the amplitude of the read signal appearing at common emitter point of transistors T1 and T2 exceeds the control threshold level applied to diode D14 over line 72. Accordingly, the trigger 96 is turned on only when the read signal exceeds the control threshold level, and the *c* pulse is gated through the AND circuit 95 only when the trigger 96 is turned on to enable the transistor T10 to permit modification of the charge and hence the voltage of the capacitor C2 in response to detection of a mark.

Referring to FIG. 4, it will be seen that in the adapt mode, AND gate 28 is controlling, so that the read signal appears at the base of the transistor T16. Modification of the charge on the capacitor C6, which controls the maximum store signal on line 59, instead of occurring at each *c* time as determined by diode gate D26–D28, will occur only if the trigger 10 is turned on to apply a positive level to the diode D34 of the AND gate D33–D34. The trigger 103 will be turned on by the transistor T26 in response to an incremental potential change at the emitter of transistor T27, if the read signal present at the common emitter of transistors T16–T17 is greater than the previous maximum erasure level, as determined by the level on the line 66 through the action of the OR circuit D35–D36. This control is further limited by the requirement that the read signal must be less than the control threshold level which is evidenced by the off output level of the trigger 96 of FIG. 3 over line 75, which is applied to the diode D33 of the diode gate D33–D34. These conditions being met, a positive level appears on the line 101 and at *c* time the transistor T21 will be turned on to modify the charge on the capacitor C6 in accordance with the read signal amplitude as applied to the diode D27 through the transistor T20.

Referring to FIG. 7, it will be seen that the left-hand portion of the curve R in FIG. 7*a* represents a read mark during the learn model. The upper threshold level as represented by the curve U, starts at an initially high value and is adjusted in accordance with the read marks to a value representative of the general minimum mark signal amplitude. Thel ower threshold indicated by the character L, starts at a relatively low value and is raised toward the upper threshold in accordance with erasure marks detected during the learn mode. Under normal operations in the hold mode, these upper and lower threshold values remain fixed, and the control threshold indicated by the character CO, will be at some intermediate value as determined by the setting of the potentiometer 70 of FIG. 1. During normal operations in the adapt mode, it will be seen that the upper level may be progressively lowered in accordance with the lower values of marks encountered, while the lower threshold may be raised in accordance with erasure signals falling between the control threshold and the lower threshold.

Referring to FIG. 7*b*, it will be seen that an overlap between the upper threshold and lower threshold values is indicated at the point P. Under such a condition, the range overlap switch 76 of FIG. 1 and which is described in detail in connection with FIG. 6 of the drawings, operates to switch the connections of the minimum mark and maximum erasure level lines 56 and 66 to maintain the upper threshold and lower threshold lines 57 and 67 in the proper relationship.

Referring to FIG. 8, there is shown an adaptive threshold circuit for a mark sensing system similar to that described in FIG. 1, but embodying an incremental positional servo for storage of minimum and maximum threshold levels, instead of utilizing the analog-to-digital and ditital-to-analog conversion system of FIG. 1. In FIG. 8 the reference numeral 10 as hereinbefore designates the inputs from a plurality of channels of a multi-channel read head applied to amplifiers 12 associated with upper and lower threshold detection circuits 14 and 16, respectively. As hereinbefore, a mix circuit 20 is utilized in connection with the amplifiers 12 for providing a common read signal in response to detection of a mark of any of the multi-channels. A plurality of gates 22–28 is provided for selectively responding to the timing pulses over line 36, the read signal over line 21 and learn mode control potentials over lines 42 and 44, or an adapt control potential over conductor 48. Instead of utilizing the analog-to-digital store circuitry of the right-hand portion of FIG. 1, minimum adapt control and minimum amplitude store circuitry 130 is utilized in conjunction with a motor drive control circuit 136 and a compare circuit 138 for controlling driver 140 to operate a motor operated potentiometer 150 for establishing the minimum mark level or long-term threshold on conductor 56. Likewise, a corresponding maximum adapt control and maximum amplitude store circuit 132 is used in conjunction with a motor drive control 156 and compare circuit 158 for controlling driver 160 to operate a motor operated potentiometer 162 for establishing the maximum erasure level or long-term threshold on line 66. A range overlap switch 76 is utilized to selectively control the connections of lines 56 and 66 and the upper and lower threshold level lines 57 and 67, respectively. A potentiometer 70 connected between the lines 56 and 66 is utilized to provide a control threshold signal intermediate to the minimum mark and maximum erase long-term levels over the line 72.

Referring to FIG. 9, it will be seen that the adapt gate 22 and the learn gate 24 comprise diodes D1–D3 and D4–D6 as in FIG. 3. These gates control transistors T1 and T2 arranged in a common emitter follower configuration as an OR circuit for controlling the operation of a transistor T3 which effects charging of the capacitor C1 in accordance with the amplitude of the read signal over line 21. Transistor T4 is arranged in shunt relation with the capacitor C1 for effecting discharge of the capacitor at D pulse time. Likewise, transistor T5 is connected in an emitter follower configuration for providing an output proportional to the amplitude of the read signal. Instead of utilizing the emitter output of the transistor T5 for controlling the charge on a capacitor, as in the circuit of FIG. 3, the transistor T5 provides an input to transistor T60 through an OR circuit comprising diodes D50 and D51 for applying a pulse through a capacitor C12 for controlling transistor T62 for applying a pulse to trigger 163 for providing an operating signal for the motor operated potentiometer 162 for establishing the minimum mark level threshold.

During the learn mode a learn control potential is applied through an OR circuit comprising diodes D52 and D53 to an AND circuit comprising diodes D55 and D56 in conjunction with a B timing signal for providing an output over line 165 to an AND circuit comprising diodes D58 and D60 for operating a transistor T64 which provides a sampling signal through diode D50 for the transistor T60. The signal over line 165 is ANDED with a signal from a minimum mark potentiometer over line 74. The minimum mark level from the minimum mark potentiometer as applied to diode D60 over conductor 74 is sampled at B pulse time in the AND circuit comprising diodes D58 and D60, thereby producing a signal at the emitter of transistor T64 which rises to the potential of the minimum mark level. Only if this potential exceeds the level applied to diode D51 from the emitter of transistor T5 will there be an incremental change at the emitter of transistor T60 to turn on trigger T62.

When in the adapt mode, trigger 96 is used to control the application of an on output signal to the diode D52 or an off output signal to the line 75. Trigger 96 is turned on by transistor T12 in response to a positive incremental potential change at the emitter of T14 as coupled by capacitor C4 only when the control threshold level applied to diode D14 over line 72 is exceeded by the read signal appearing at the common emitter point of transistors T1 and T2.

Referring to FIG. 10, it will be seen that the circuitry is generally similar to that of FIG. 4, in that the AND gates 26 and 28 are connected to resistors T17 and T16 respectively, for controlling transistor T18 to provide a charge on the capacitor C5 which is proportional to the read signal on line 21. Transistor T19 is connected in shunt relation with the capacitor C5 for discharging the capacitor to reset it at D pulse time. Transistor T20 is connected in an emitter follower configuration to the capacitor C5 for providing an output to AND circuit consisting of diodes D62 and D64 for applying the read level signal to transistor T70 through the OR circuit comprising diodes D66 and D68. Transistor T70 is connected to provide a pulse from a capacitor C14 for turning on the transistor T72 to provide a turn-on pulse to the trigger 166, the on output of which is used to control the motor operated potentiometer 162 over line 167. The voltage level applied to diode D64 from the emitter of transistor T20 is sampled at B pulse time in the AND circuit comprising D62 and D63, thereby producing a signal at the emitter of transistor T68 which rises to the level of the current read signal. Only if this potential exceeds the maximum erasure level from the maximum erasure potentiometer as applied to diode D68 will there be an incremental change at the emitter of transistor T70 to turn on trigger 166.

When in the learn mode, a signal is applied at the B pulse time to AND circuit comprising diodes D70 and D72 through diode D76 of an OR circuit and over line 170 to the diode D62 of AND circuit D62–D64.

When operating in the adapt mode, the signal over the line 170 is provided through diode D74, the B timing pulse being ANDED in an AND circuit comprising diodes D78, D79 and D80. A trigger 103 is utilized to provide an on output potential through diode D79, while the connection to diode D78 comes from line 75 of FIG. 9, which is up only when the read signal is less than the control threshold of line 72. The trigger 103 is reset by a C timing pulse and arranged to be set through operation of a control circuit including a transistor T12 which is operated by an incremental pulse through capacitor C4 from transistor T14 which in turn is controlled by a comparing OR circuit comprising diodes D14 and D16. Diode D14 is connected to line 66 which is at the maximum erasure threshold level, and diode D16 is connected to the common emitters of transistors T16 and T17 so that it will be at the level of read signal from conductor 21. Thus the transistor T14 is arranged to be controlled for producing a pulse across capacitor C4 only when the read signal is greater than the previous maximum erasure level on line 66.

Referring to FIG. 11, there is shown a motor operated potentiometer circuit which is similar to those used for both the maximum erasure level and the minimum mark level, the only difference being the polarity of the potentiometer will be reversed, so the description will be limited to the circuitry for the maximum erasure level potentiometer 162. The motor operated potentiometer 162 comprises a potentiometer **162*a* having a movable contact 162*b* operatively connected to the armature 162*m* of a stepping type motor 162M. The motor has stepping windings W1, W3, W4 and W5 having terminals 1, 3, 4 and 5 respectively, the center points between the windings W1 and W3 and windings W4 and W5 being connected to ground. Drivers DR1–DR4 are connected to the terminals 1, 3, 5 and 4 respectively for effecting operation of the motor. A plurality of triggers TR1, TR2 and TR3 are binary connected for energizing the drivers in response to turn on of one or the other of the transistors T75 and T76. The transistor T75 is arranged to be turned on in response to coincidence of a C timing pulse and a pulse over line 167 from the motor adjust trigger 166 of FIG. 10 through a gate comprising diodes D82 and D83. A reset relay RR is provided having a pick winding PRR and a hold winding HRR. The pick winding PRR is connected to be energized through a reset switch RS, while the hold winding is connected to be energized through armature RR4 and front contact of the reset relay and a limit switch LS which opens in the home position of the stepping motor 162M. The contact RR3 is connected to effect operation of the transistor T76 in response to emitter pulses over line 175** from a suitable pulse source for operating the triggers TR1, TR2, and TR3 to reset the stepping motor by operating in the reverse direction.

With the potentiometer **162*a* in its lowest operating position, line 163, connected to the movable contact 162*b*, and which connects the potentiometer to the maximum erase threshold level line 66, will place the maximum erase line at its lowest level. Initially, with triggers TR1, TR2 and TR3 all off, the off output from trigger TR2 over line 177 will energize at terminal 1 through driver DR1, and the off output of trigger TR3 will energize driver DR3 to energize terminal 5 through armature RR1 and its back contact. This may be designated the home position of the potentiometer. When the trigger 166 is turned on, through operation of the transistor T72 as hereinbefore described, the on output will be applied to the diode D83 and upon the occurrence of a C timing pulse, transistor T75 will be switched on. This applies a negative pulse to the trigger TR1 turning trigger TR1 on. This causes the off output of trigger TR1 to fall and turns on TR2. Accordingly, the off output of TR2 falls and the driver DR1 is turned off, de-energizing terminal 1. At this same time, the on output of TR2 rises and driver DR2 energizes terminal 3. The turn-on of the trigger TR1 does not effect the condition of trigger TR3 so that terminal 5 remains energized. The combination of terminals 3 and 5 energized, causes the motor to advance one increment. The triggers 1, 2 and 3 operate in a binary fashion to energize the terminals 1–5** as indicated in the table of FIG. 11*a* in response to sequential C pulses, so long as the line 167 from the motor adjust trigger 166 remains up, and the motor will continue to step to move the movable contact **162*b* towards the positive end of the potentiometer, thus raising the potential of the line 163 which establishes the maximum erasure threshold level of line 66**.

Referring to FIG. 12, it will be seen that the clock 35 comprises a plurality of single shots 180, 181 and 182 together with a multivibrator 184. The single shot 180 is connected to provide substantially 50 millisecond long *a* pulses in response to D pulse inputs as read from the commutator marks on the document, indicating the location of possible marks to be read. The single shot 180 drives the single shot 181 to produce relatively long timing pulses designated by the arrow. The output of the single shot 181 is used to synchronize the multivibrator so as to produce a series of B timing pulses for each pulse from the single shot 181, as illustrated by the curve B. The multivibrator in turn drives the single shot 182 to produce corresponding pluralities of C pulses which occur at the fall of the B pulses. D timing pulses are produced directly from the input line from the marks detected on the document as represented by the curve D. The curve M represents pulses applied to the motor adjust trigger TR1, while the curve P represents the level of the maximum erasure threshold potentiometer **162*a***. The minimum mark control potentiometer is controlled in a similar manner, with the exception that in its home position the movable contact arm will be at the positive end of the potentiometer, and the stepping motor will be arranged to increment the potentiometer towards the negative end of the potentiometer.

At the end of an operation, the reset switch RS will be operated to pick the reset relay RR. Closing of contact RR4 holds the reset relay in the operating condition. Armature RR3 and the front contacts provide a circuit for operating the reset transistor T76 in response to emitter pulses to advance the trigger count, and armatures RR1 and RR2 being operated to engage their front contacts, arrange the motor windings for reverse operation of the motor to a home position in which the limit switch LS opens and interrupts the holding circuit for the reset relay, so as to condition it for a new sequence of operations.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an adaptive threshold circuit,
   a multi-channel read head,
   upper and lower threshold circuits connected to each channel,
   circuit means common to all of said read head channels for producing a read signal,
   additional circuit means connected to said circuit means for establishing minimum mark and maximum erasure signal levels, and means connecting said additional circuit means to control the upper and lower threshold circuits.

2. An adaptive threshold circuit comprising:
a plurality of signal input circuits,
a pair of threshold circuits connected to each input circuit,
mix means connected to every input circuit to produce an output signal in response to any one of the signals,
gate means connected to said mix means,
switch means operable to effect selective control of the gate means,
minimum and maximum store circuits controlled by said gate means,
and circuit means connecting said store circuits to establish levels for each of the pairs of said threshold circuits.

3. In an adaptive threshold circuit,
a multi-channel read head for scanning a plurality of possible mark positions on a document,
uper and lower threshold circuits connected to each of said channels,
minimum and maximum store circuits,
a mix circuit connected to produce an output signal in response to signals from one or more read head channels,
clock means for producing a plurality of timed control signals in predetermined relation to each possible mark position,
gate means connecting the mix and the store circuits in response to predetermined ones of the control signals,
long time store means for storing representations of said mix and store circuits levels,
and means for applying said representations to said threshold circuits to determine the validity of marks in said mark positions.

4. In an adaptive threshold circuit,
a multi-channel read circuit for producing signals representative of marks in a plurality of possible mark positions,
means common to all channels for producing a read signal,
upper and lower threshold circuits connected to each of said channels for distinguishing between minimum mark and maximum erasure conditions,
minimum mark and maximum erasure store circuits connected to be responsive to said read signal,
means connected to the minimum and maximum circuits for developing a long time storage signal from each of said circuits and applying them to said upper and lower threshold circuits,
means for producing a control threshold intermediate said long time storage signals,
minimum and maximum adapt circuits responsive to the read signal,
and circuit means connecting the minimum and maximum adapt circuits to modify the maximum erasure signal when the read signal is less than the control threshold and greater than the previous maximum erasure level.

5. In a signal threshold level control circuit,
means for producing timed clock signals in predetermined relation to possible mark positions,
gate means responsive to a read signal from a mark, a clock signal and a learn signal to produce an analog output signal,
storage means for storing a charge in accordance with the gate means output signal,
additional storage means having a predetermined initial storage level value,
means connecting the storage means and additional storage means to modify the charge on the additional storage means in accordance with the charge on the storage means from a read signal,
means responsive to the level of said additional storage means for establishing a long term analog level, and means for stabilizing the charge on the additional storage means against negative drift in accordance with the long term analog level whenever the potential of the additional storage means falls below the long term analog level.

6. In a minimum store and adapt circuit,
a first storage means,
gate means responsive to an input signal for storing a charge in said storage means,
a second storage means,
means for initially placing a maximum charge on said second storage means before receipt of any input signals,
switch means connected to effect a reduction in said maximum charge,
and means connecting said switch means, said first storage means, and said second storage means including gate means responsive to the charges on said storage means for reducing the charge on the second storage means in accordance with the charge on the first storage means.

7. In an adaptive threshold circuit for a multi-channel read device having upper and lower threshold devices connected to each channel,
minimum mark and maximum erasure level storage means,
minimum mark and maximum erasure analog long time storage means,
voltage divider means connected to the long time storage means to produce a control threshold intermediate thereto,
means producing output signals in response to read signals above and below the control threshold,
and means selectively responsive to said output signals for modifying the charges of the minimum mark and maximum erasure storage means.

8. In an adaptive threshold circuit for a multi-channel mark detection read head having upper and lower threshold mark detecting circuits individual to each channel,
a mix circuit common to all channels for generating a read signal in response to detection of a mark by any channel,
mark and erasure level store circuits having predetermined initial storage values,
mark and erasure adapt circuits connected to modify the storage values of the mark and erase level store circuits respectively in opposite senses,
and means connected to the mark and erasure level store circuits for providing mark and erasure threshold level signals to the upper and lower threshold detecting circuits.

9. In an adaptive threshold circuit for a multiple channel mark detection read head having first and second threshold circuits connected to each channel,
maximum erasure level and minimum mark level storage means,
means for initially setting the levels of the storage means at minimum and maximum levels respectively,
circuit means common to a plurality of said channels for producing a read signal in response to detection of a mark by any of said channels,
adapt circuit means connected to modify the levels of the maximum erasure and minimum mark level storage means in opposite senses toward the level of a read signal,
means for producing long time maximum erasure and minimum mark level signals in accordance with the levels of the maximum and minimum level storage means,
means connecting the long time maximum erasure and minimum mark storage circuits to produce a control threshold intermediate thereto,
and circuit means comparing the read signal and the control threshold connected to control the modification of the storage means levels by the adapt circuits.

10. In an adaptive threshold circuit for a multi-channel mark detecting read head having first and second threshold discriminator circuits for each channel,
a mix circuit connected to all channels to produce a read signal in response to detection of a mark in any channel,
minimum mark and maximum erasure level store circuits,
means for initially establishing minimum and maximum levels on said circuits respectively,
minimum and maximum adapt circuits connected to modify the levels of said store circuits in opposite directions in response to read signals,
circuit means for establishing long time minimum mark and maximum erasure signal levels in response to the levels of said respective store circuits,
and overlap control means connecting the long time circuit means to said first and second threshold discriminator circuits for reversing said connections when the minimum mark level and maximum erasure level overlap.

11. In an adaptive threshold circuit for a multi-channel mark detecting read head having upper and lower threshold circuits individual to each channel,
circuit means common to all channels connected to produce a read signal in response to detection of a mark by any of said channels,
upper and lower threshold store means,
circuit means for initially setting the storage levels of said store means at maximum and minimum values respectively,
circuit means individual to said upper and lower threshold store means for modifying the storage levels therein in accordance with each read signal,
analog-to-digital converter means individual to each said upper and lower threshold store means for producing digital signals in accordance with the values of the storage levels in the corresponding store means,
digital store means for storing said digital signals,
digital-to-analog conversion means for converting the stored digital signals into long time analog values,
and circuit means connecting the digital-to-analog conversion means to the upper and lower threshold circuits of each channel for applying upper and lower threshold level signals thereto.

12. In an adaptive threshold circuit for a mark detection read head having upper and lower threshold detection circuits connected thereto,
means connected to said read head for producing a read signal in response to detection of a mark,
upper and lower threshold level store means,
circuit means connected to initially establish maximum and minimum level values for said store means,
additional circuit means including a storage device for modifying the level values of said store means in opposite senses in accordance with said read signals,
analog-to-digital store means for producing digital output values in accordance with said level values,
digital storage means for storing said digital output values, and
digital-to-analog conversion means connecting said digital storage means to the respective upper and lower threshold detection circuits.

13. In an adaptive threshold circuit for a signal detection circuit having upper and lower threshold detection circuits connected thereto,
minimum level and maximum level store means,
circuit means connected to initially establish maximum and minimum levels in said store means, respectively,
additional circuit means connected between the detection circuit and the store means for modifying said minimum and maximum levels in opposite senses, and
circuit means connected between the store means and the respective threshold detection circuits for maintaining long time threshold level values for said detection circuits.

14. In an adaptive threshold circuit for a mark detection read head having upper and lower level threshold circuits connected thereto,
upper and lower threshold level store means each including a motor operated potentiometer,
circuit means connected to initially establish maximum and minimum signal levels on said store means above and below the maximum and minimum read signals, respectively,
adapt circuit means connecting the store means and the read head for modifying the signal levels thereof in opposite senses, respectively, in accordance with read signals therefrom, and
additional circuit means including reversing means responsive to an overlap of said maximum and minimum levels connecting the store means to their respective upper and lower level threshold circuits.

15. In an adaptive threshold circuit for a mark detection read head having upper and lower threshold circuits connected therewith requiring different threshold level signals,
upper and lower threshold level store means including a motor operated potentiometer for each level connected to the associated threshold circuit,
means for initially establishing maximum and minimum level conditions for said upper and lower level store means,
adapt means responsive to a read signal from said read head,
clock means for producing a plurality of timed pulses in timed relation with each read mark position,
and gate means selectively responsive to said timed pulses and the read signal for effecting operation of the motor operated potentiometer to vary the threshold levels in opposite senses.

References Cited

UNITED STATES PATENTS

| | | | |
|---|---|---|---|
| 3,296,593 | 1/1967 | Sauvan | 340—172.5 |
| 3,262,101 | 7/1966 | Halpern | 340—172.5 |
| 3,222,654 | 12/1965 | Widrow et al. | 340—173 |
| 3,199,111 | 8/1965 | Jennings et al. | 346—29 |
| 3,147,343 | 9/1964 | Meyer et al. | 179—1 |

ROBERT C. BAILEY, *Primary Examiner.*

G. D. SHAW, *Assistant Examiner.*